(12) United States Patent
Matsuoka et al.

(10) Patent No.: US 8,081,421 B2
(45) Date of Patent: Dec. 20, 2011

(54) SOLID ELECTROLYTIC CAPACITOR

(75) Inventors: Keiko Matsuoka, Izumisano (JP); Shoji Umeda, Daito (JP); Yoshiyuki Fushimi, Nikko (JP); Koji Tezuka, Nikko (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 288 days.

(21) Appl. No.: 12/330,027

(22) Filed: Dec. 8, 2008

(65) Prior Publication Data

US 2009/0147449 A1 Jun. 11, 2009

(30) Foreign Application Priority Data

Dec. 6, 2007 (JP) ................................. 2007-316165

(51) Int. Cl.
*H01G 9/025* (2006.01)
(52) U.S. Cl. ........ 361/540; 361/525; 361/528; 361/529; 361/516; 361/519; 29/25.01; 29/25.03
(58) Field of Classification Search .................. 361/523, 361/516–519, 525, 528–529, 540–541, 536–537; 29/25.01, 25.03
See application file for complete search history.

(56) References Cited

U.S. PATENT DOCUMENTS

| | | | | |
|---|---|---|---|---|
| 4,037,142 A * | 7/1977 | Poole | ............................ | 361/520 |
| 4,539,623 A * | 9/1985 | Irikura et al. | ................. | 361/540 |
| 6,343,004 B1 * | 1/2002 | Kuranuki et al. | ............. | 361/523 |
| 6,625,009 B2 * | 9/2003 | Maeda | ........................... | 361/528 |
| 6,751,086 B2 * | 6/2004 | Matsumoto | .................. | 361/523 |
| 6,808,541 B2 * | 10/2004 | Maeda | .......................... | 29/25.03 |
| 6,816,358 B2 * | 11/2004 | Kida et al. | ..................... | 361/540 |
| 6,891,717 B2 * | 5/2005 | Fujii et al. | ..................... | 361/523 |
| 7,468,882 B2 | 12/2008 | Marek et al. | | |
| 7,729,102 B2 * | 6/2010 | Kuriyama | ..................... | 361/523 |
| 2005/0117280 A1 | 6/2005 | Audo | | |
| 2006/0056136 A1 | 3/2006 | Fujii et al. | | |
| 2007/0081301 A1 | 4/2007 | Tanaka | | |
| 2009/0147448 A1 * | 6/2009 | Matsuoka et al. | ............ | 361/540 |

FOREIGN PATENT DOCUMENTS

| | | |
|---|---|---|
| GB | 2 262 840 A | 6/1993 |
| JP | 52-164244 U | 12/1977 |
| JP | 61-083025 U | 6/1986 |

(Continued)

OTHER PUBLICATIONS

Korean Office Action dated Nov. 10, 2010, issued in corresponding Korean Patent Application No. 10-2008-0110383.

(Continued)

*Primary Examiner* — Nguyen T Ha
(74) *Attorney, Agent, or Firm* — Westerman, Hattori, Daniels & Adrian, LLP

(57) ABSTRACT

A solid electrolytic capacitor includes a capacitor element, an anode lead frame, a cathode lead frame, and a mold resin portion. The anode lead frame includes an anode terminal portion and a rising portion, and the anode terminal portion is exposed at the bottom surface of the mold resin portion. The rising portion is formed integral with the anode terminal portion, and rises to the anode portion. In the rising portion, a through hole is formed. The cathode lead frame includes a cathode terminal portion, a pair of side surface portions and a step portion. Thus, a solid electrolytic capacitor allowing highly accurate and reliable attachment of the capacitor element to the lead frame without using any additional member is provided.

9 Claims, 13 Drawing Sheets

| | FOREIGN PATENT DOCUMENTS | | |
|---|---|---|---|
| JP | 01-259521 | A | 10/1989 |
| JP | 04-055126 | U | 5/1992 |
| JP | 8-195330 | A | 7/1996 |
| JP | 10-032144 | A | 2/1998 |
| JP | 2002-367862 | A | 12/2002 |
| JP | 2005-166832 | A | 6/2005 |
| JP | 2005-353709 | A | 12/2005 |
| JP | 2006-108172 | A | 4/2006 |
| JP | 2006-302920 | A | 11/2006 |
| JP | 2006-319113 | A | 11/2006 |
| JP | 2007-081069 | A | 3/2007 |
| KR | 1996-0010110 | B1 | 7/1996 |
| KR | 20-0406127 | Y1 | 1/2006 |
| KR | 10-2006-0113347 | A | 11/2006 |

OTHER PUBLICATIONS

Korean Office Action dated Nov. 10, 2010 issued in corresponding Korean Patent Application No. 10-2008-0110385.

US Office Action dated Nov. 15, 2010 issued in corresponding U.S. Appl. No. 12/329,843.

Notice of Allowance dated Mar. 1, 2011, issued in related U.S. Appl. No. 12/329,843.

Japanese Notice of Grounds of Rejection mailed on Jul. 26, 2011, issued in Japanese patent application No. 2007-316165.

* cited by examiner

SOLID ELECTROLYTIC CAPACITOR

BACKGROUND OF THE INVENTION

1. Field of the Invention

The present invention relates to a solid electrolytic capacitor and, more specifically, to a solid electrolytic capacitor having a capacitor element mounted on a prescribed lead frame and sealed with a mold resin portion.

2. Description of the Background Art

A solid electrolytic capacitor is one of electronic components that can be surface-mounted on a printed circuit board or the like. As shown in FIG. 19, a solid electrolytic capacitor 101 of this type includes a capacitor element 102, an anode lead frame 110, a cathode lead frame 120 and a mold resin portion 140 sealing these components. Capacitor element 102 has a substantially columnar (rectangular parallelepiped) anode body 103, an anode portion 104 protruded from the body, and a cathode portion 105 formed on an outer surface surrounding anode body 103. Anode lead frame 110 is electrically connected to anode portion 104 with a pillow member 180 interposed, and cathode lead frame 120 is electrically connected directly to cathode portion 105. Other than the pillow member, a member of different shape, formed to have a prescribed shape, is also used in some capacitors.

Solid electrolytic capacitor 101 of this type is manufactured in the following manner. First, a lead frame is punched out to have a prescribed shape, whereby a portion to be the anode lead frame and a portion to be the cathode lead frame are formed. Next, a conductive pillow member is welded on the portion to be the anode lead frame. Next, the anode portion of capacitor element is placed at a prescribed position with respect to the welded pillow member, and the cathode portion is placed at a prescribed position on the portion to be the cathode lead frame, and the capacitor element is attached to the lead frame.

Next, the portion to be the anode lead frame, the portion to be the cathode lead frame and the capacitor element are surrounded by a prescribed metal mold, and mold resin is poured to the metal mold, so that the capacitor element and the like are sealed. Thereafter, the mold resin portion sealing the capacitor element and the like is cut out at a prescribed position from the lead frame, and the solid electrolytic capacitor is completed. In the solid electrolytic capacitor, a part of anode lead frame and a part of cathode lead frame protrude as terminals, from the mold resin portion.

A method of welding the pillow member at the anode portion of capacitor element has also been proposed, rather than welding the pillow member at the portion to be the anode lead frame. The solid electrolytic capacitors of this type are disclosed, for example, in Japanese Patent Laying-Open Nos. 2002-367862 and 2006-319113.

The conventional solid electrolytic capacitor 101, however, has the following problems. As described above, in order to electrically connect anode portion 104 and anode lead frame 110 of capacitor element 102, pillow member 108 is positioned between anode portion 104 and anode lead frame 110. Therefore, when attaching capacitor element 102 to the lead frame, an additional member is required, and a process step of welding the pillow member 108 as such to the lead frame is additionally required, hindering reduction of manufacturing cost.

Further, when pillow member 180 is welded on anode portion 104 of capacitor element 102, location or strength of welding may vary, making it difficult to attach capacitor element 102 to the lead frame with high accuracy. This leads to lower production yield of solid electrolytic capacitor 101.

SUMMARY OF THE INVENTION

The present invention was made to solve the above-described problem, and its object is to provide a solid electrolytic capacitor allowing highly accurate and reliable attachment of the capacitor element on the lead frame without applying any additional member.

The present invention provides a solid electrolytic capacitor, including a capacitor element, a mold resin portion, an anode lead frame and a cathode lead frame. The capacitor element has an anode portion and a cathode portion. The mold resin portion seals the capacitor element. The anode lead frame is connected to the anode portion. The cathode lead frame is connected to the cathode portion. The anode lead frame includes an anode terminal portion and a rising portion. The anode terminal portion is exposed along the bottom surface of the mold resin portion. The rising portion is formed integral with the anode terminal portion, and rises from the anode terminal portion toward the anode portion of the capacitor element. A through hole is formed in the rising portion.

In this structure, the anode portion of the capacitor element is connected, supported from below, to the rising portion formed integral with the anode terminal portion of the anode lead frame. Therefore, as compared with the solid electrolytic capacitor having the pillow member interposed between the lead frame and the anode portion, the additional pillow member becomes unnecessary, and the process step of welding the pillow member to the lead frame becomes unnecessary, whereby manufacturing cost can be reduced. Further, as the through hole is formed at the rising portion of the anode lead frame, the stress generated at the rising portion because of the pressing force applied when the anode portion is welded to the rising portion is alleviated by the through hole, and the heat at the time of welding is radiated by the through hole, alleviating thermal distortion caused by the heat of welding. This helps to prevent deformation of the rising portion, and highly accurate attachment of the capacitor element becomes possible. Further, as the mold resin flows to the through hole, the through hole serves as an anchor, improving closer contact between the anode lead frame and the mold resin portion.

Preferably, the through hole is formed at a region other than a region immediately below the anode portion, of the rising portion.

Therefore, even when the rising portion should melt by the heat when the anode portion is welded to the rising portion of the anode lead frame and a part of the anode portion should go down, it is possible to prevent the anode portion from going down to the through hole.

In connection with the specific structure of the anode lead frame, preferably, the rising portion rises from an end of the anode terminal portion closer to the cathode portion of the capacitor element.

Further, preferably, the rising portion includes an upper end portion in contact with the anode portion, and side end portions at one and the other positions in a direction of extension of the upper end portion; and each of the side end portions is bent in a direction away from the cathode portion of the capacitor element.

Therefore, it becomes possible to reliably prevent deformation or falling of the rising portion because of the pressing force when the anode portion is welded to the rising portion of the anode lead frame. Further, as the side end portion is bent, closer contact to the mold resin portion can be attained.

Further, the number of capacitor elements is not limited to one, and a plurality of capacitor elements may be provided. In that case, preferably, the anode portions of the plurality of capacitor elements are arranged in the same orientation and in contact with the anode lead frame.

When a plurality of capacitor elements are mounted, preferably, the through hole is formed at a region immediately below a portion between one and the other capacitor elements adjacent to each other, among the plurality of capacitor elements. Further, preferably, the through hole is formed to be larger in number than the capacitor elements.

Accordingly, the stress generated in the anode lead frame because of the pressing force when the anode portion is welded to the anode lead frame can effectively be alleviated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Solid Electrolytic Capacitor

Figure 1:
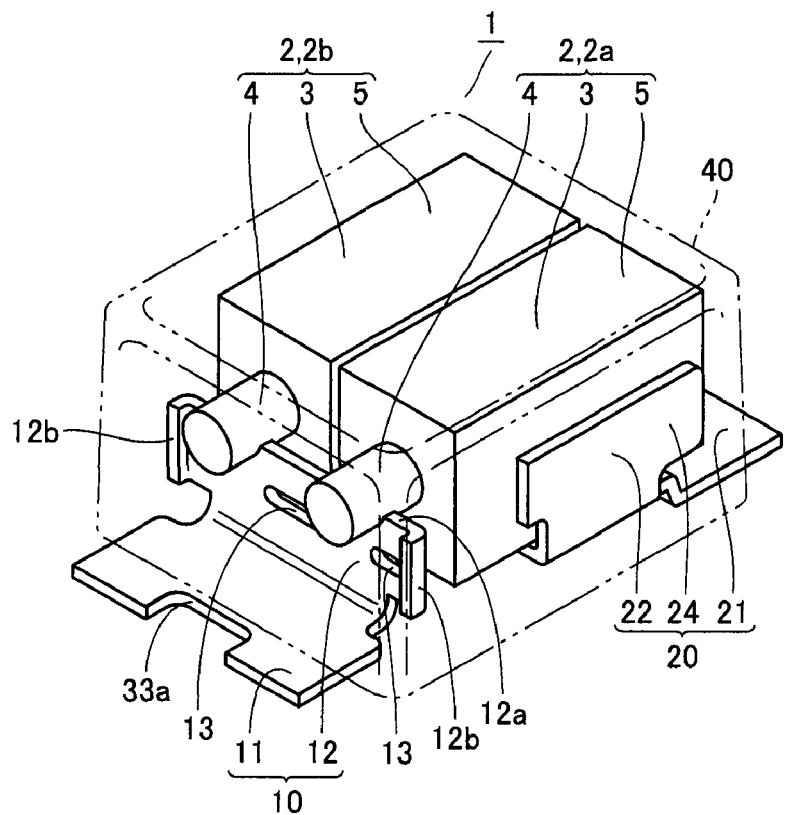
FIG. 1 is a perspective view showing a solid electrolytic capacitor in accordance with an embodiment of the present invention.
Figure 2:
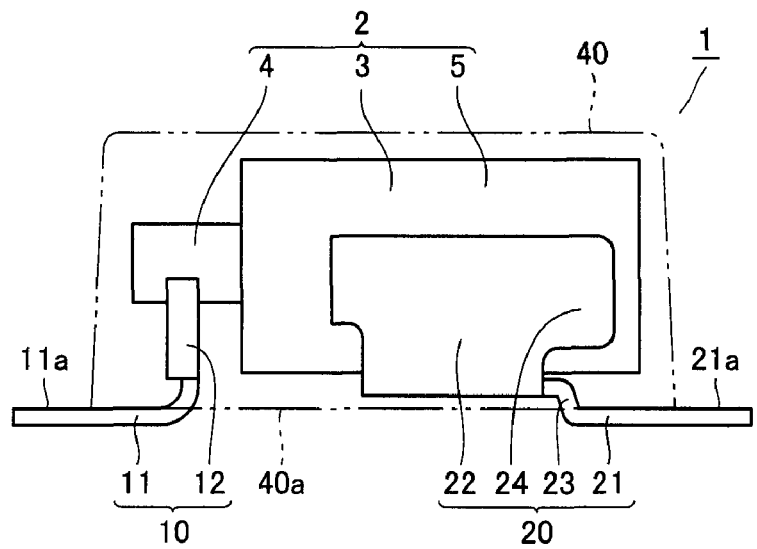
FIG. 2 is a side view of the solid electrolytic capacitor shown in FIG. 1, in accordance with the embodiment.
Figure 3:
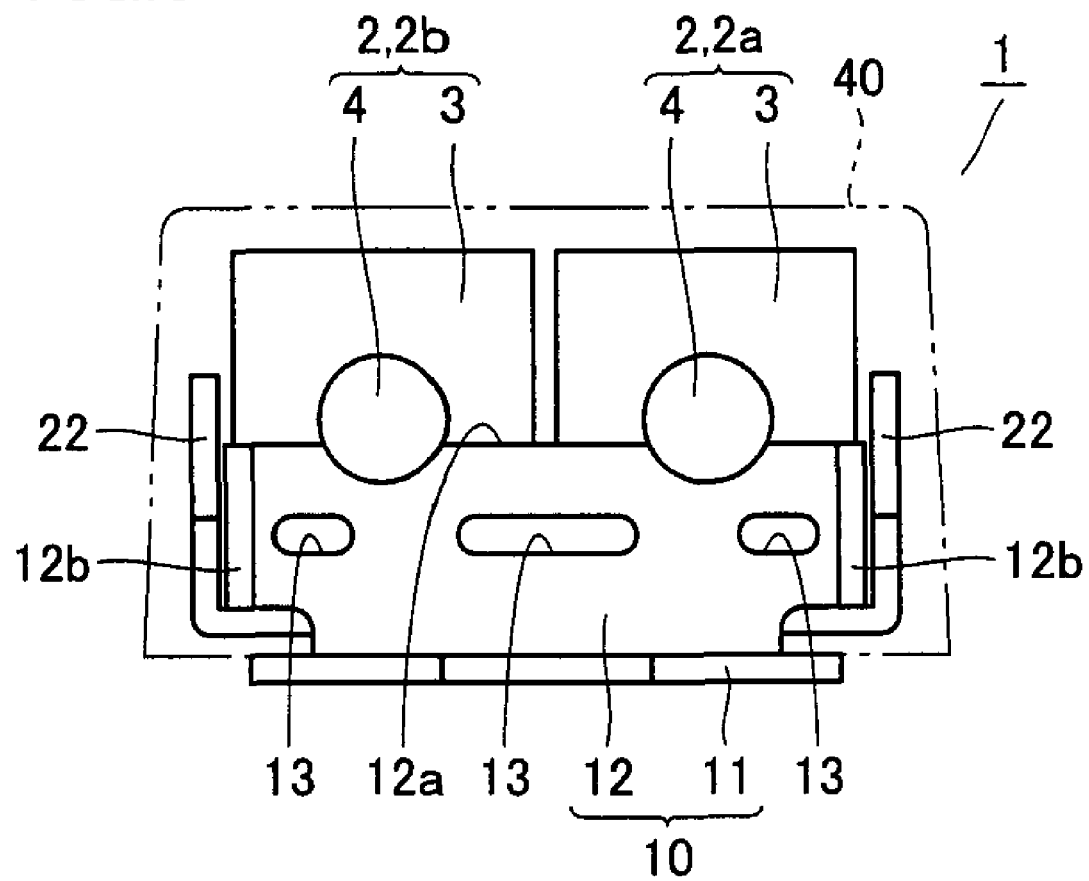
FIG. 3 is a front view of the solid electrolytic capacitor shown in FIG. 1, in accordance with the embodiment.

The solid electrolytic capacitor in accordance with an embodiment of the present invention will be described. As shown in FIGS. 1 to 3, solid electrolytic capacitor 1 includes two capacitor elements 2, 2a, 2b, an anode lead frame 10, a cathode lead frame 20 and a mold resin portion 40 sealing these. Capacitor element 2 has a substantially columnar (rectangular parallelepiped) anode body 3, an anode portion 4 protruded from the body, and a cathode portion 5 formed on an outer surface surrounding anode body 3. The two capacitor elements 2a and 2b are arranged with anode portions 4 facing the same direction.

Anode lead frame 10 has an anode terminal portion 11 and a rising portion 12. Anode terminal portion 11 is exposed along a bottom surface of mold resin portion 40. An upper surface 11a of anode terminal portion 11 is directly in contact with a bottom surface 40a of mold resin portion 40, and upper surface 11a and bottom surface 40a are positioned substantially on one same plane (see FIGS. 2 and 3). Rising portion 12 is formed integrally with anode terminal portion 11. Rising portion 12 extends, from an end of anode terminal portion 11 closer to cathode portion 5 of capacitor element 2 through mold resin portion 40 to anode portions 4, and connected at an upper end portion 12a of rising portion 12 to anode portion 4, supporting from below the anode portion 4 of each of the two capacitor elements 2a and 2b. At the upper end portion 12a, part of anode portion 4 sinks, because of pressing at the time of welding or melting caused by the heat of welding (see FIGS. 1 and 3).

At the rising portion 12a, three through holes 13 are formed at regions other than immediately below the anode portion of capacitor element 2. Specifically, one through hole 13 is formed between a region immediately below anode portion 4 of capacitor element 2a and a region immediately below anode portion 4 of capacitor element 2b, and each of the remaining two through holes is formed at a region between the region immediately below anode portion 4 of capacitor element 2a (2b) and closest side end portion 12b (see FIGS. 1 and 3). Further, at rising portion 12, one and the other side end portions 12b in a direction of extension of upper end portion 12a are bent in a direction away from cathode lead frame 20 (cathode portion 5) (see FIG. 1).

Cathode lead frame 20 includes a cathode terminal portion 21, a pair of side surface portions 22, and a step portion 23 (see FIG. 2). Cathode terminal portion 21 is exposed along the bottom surface of mold resin portion 40. An upper surface 21a of cathode terminal portion 21 is directly in contact with bottom surface 40a of mold resin portion 40, and upper surface 21a and bottom surface 40a are positioned substantially on one same plane (see FIG. 2). The pair of side surface portions 22 extend from cathode terminal portion 21 through step portion 23 in mold resin portion 40, and erected opposite to each other with anode body 3 of capacitor element 2 placed therebetween. Side surface portion 22 has an extended portion 24 extending in a direction opposite to the position of anode portion 4 (see FIG. 3).

Lead Frame

Figure 4:
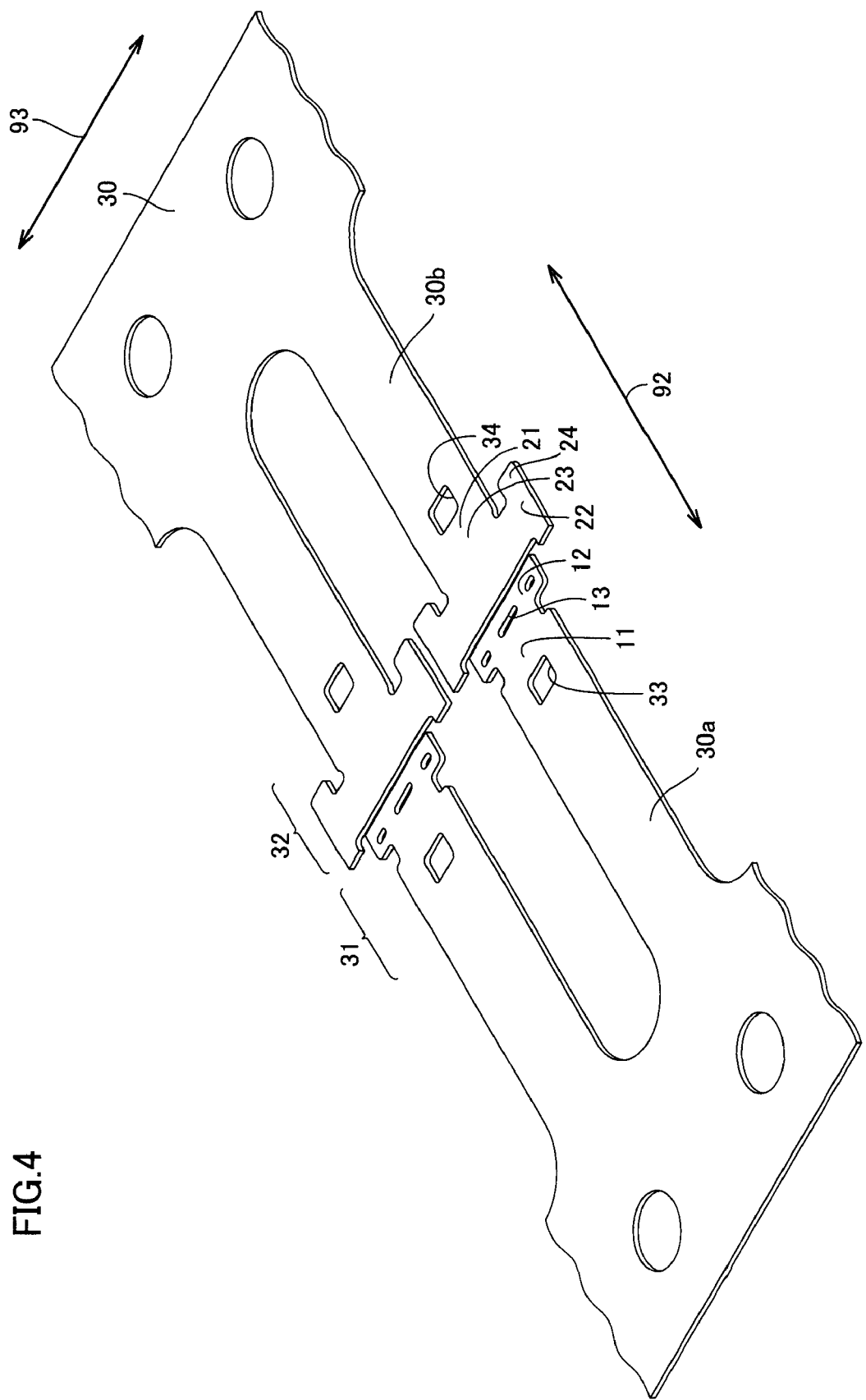
FIG. 4 is a partial perspective view showing a part of the lead frame applied to the solid electrolytic capacitor and showing a step of manufacturing the solid electrolytic capacitor, in accordance with the embodiment.

Next, anode lead frame 10 and cathode lead frame 20 of solid electrolytic capacitor 1 will be described. As shown in FIG. 4, a lead frame 30 is formed by punching out a thin sheet metal extending as a strip (in a direction indicated by an arrow 93) with a prescribed width (in a direction indicated by an arrow 92) to a prescribed shape. It is noted that the direction of arrow 92 is the shorter side direction, and the direction of arrow 93 is the longitudinal direction. A portion 31 to be the anode lead frame is formed at a portion 30a that extends from one end in the shorter side direction of lead frame 30 to the central portion in the shorter side direction. The portion 30a is punched out in a shape of anode terminal portion 11 and rising portion 12 developed two-dimensionally. At a portion connecting anode terminal portion 11 and rising portion 12, in order to ensure bending accuracy when bending rising portion 12 upward, an incurve recess is formed by punching. Further, close to a portion 31 to be the anode lead frame, a fillet hole 33 is formed, which is used for soldering the completed solid electrolytic capacitor to a printed circuit board or the like.

A portion to be the cathode lead frame 32 is formed at a portion 30b that extends from the other end in the shorter side direction of lead frame 30 to the central portion in the shorter side direction. The portion 30b is punched out in a shape of cathode terminal portion 21, side surface portions 22 and step portion 23 developed two-dimensionally. Extended portion 24 provided at side surface portion 22 is formed in a direction opposite to the side where the portion 31 to be the anode lead frame is to be formed, in order to avoid contact with the portion 31 to be the anode lead frame. Further, at a portion connecting side surface portion 22 and cathode terminal portion 21, in order to ensure bending accuracy when bending side surface portion 22 upward, an incurve recess is formed by punching. Further, close to a portion 32 to be the cathode lead frame, a fillet hole 34 is formed, which is used for soldering the completed solid electrolytic capacitor to a printed circuit board or the like.

Method of Manufacturing Solid Electrolytic Capacitor

Next, an exemplary method of manufacturing solid electrolytic capacitor will be described. First, as shown in FIG. 4, a lead frame 30 is formed, which is punched out to the shape of the portion 31 to be the anode lead frame and the portion 32 to be the cathode lead frame developed two-dimensionally (press punching process). Next, lead frame 30 is wound around a prescribed reel (not shown) and lead frame 30 is subjected to prescribed plating process (plating process). The plating process is performed prior to the next step of press bending and, therefore, it is possible to perform highly efficient plating with large number of lead frames wound around the reel.

Figure 5:
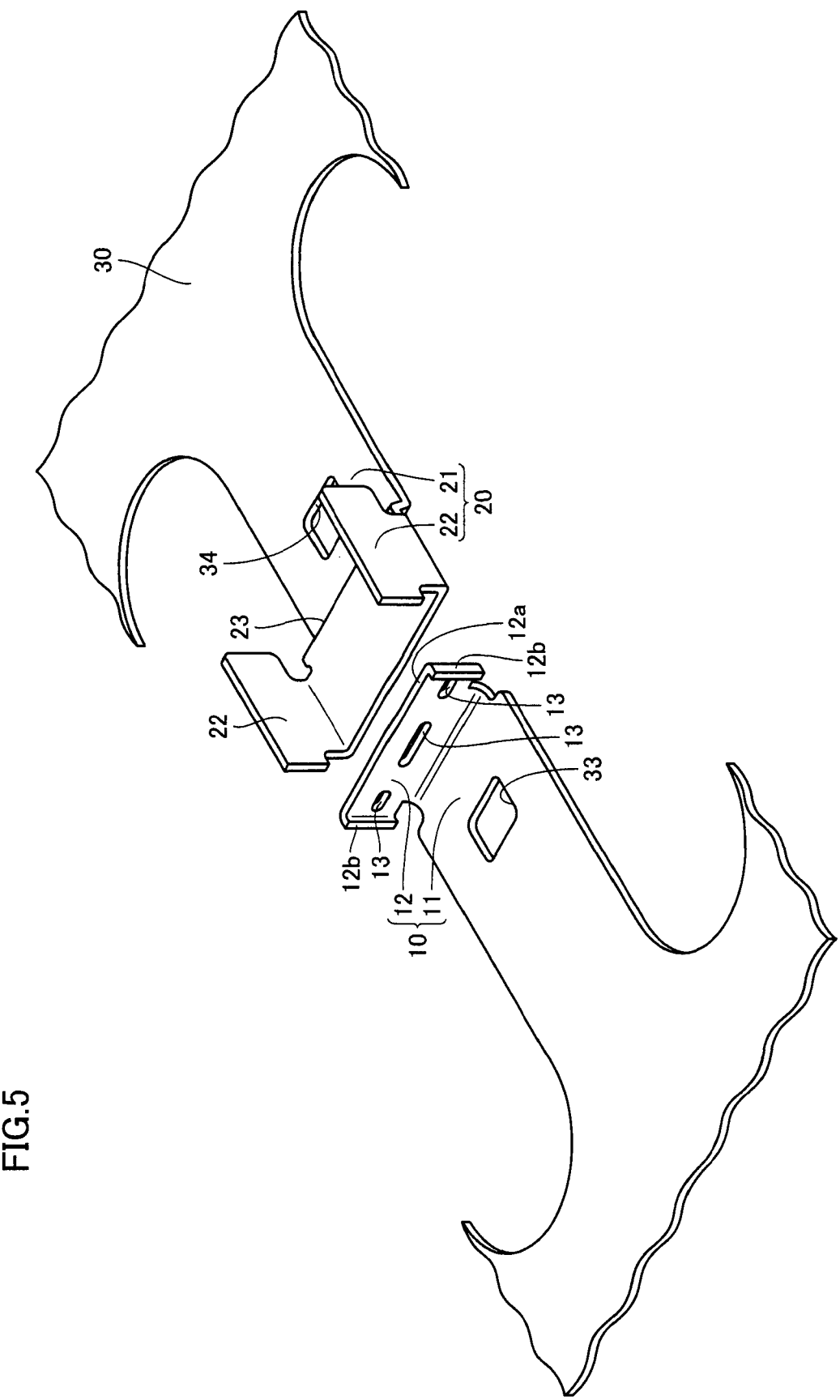
FIG. 5 is a partial perspective view showing a step following the step of FIG. 4, in accordance with the embodiment.

Next, as shown in FIG. 5, lead frame 30 is subjected to press bending (press bending process). At the portion 31 to be the anode lead frame, rising portion 12 is bent upward from anode terminal portion 11. Side end portions 12b of rising portion 12 are bent in a direction opposite to the portion 32 to be the cathode lead frame. At the portion 32 to be the cathode lead frame, step portion 23 is formed in cathode terminal portion 21, and side surface portions 22 are bent upward. Here, the recess is formed at the portion to be bent and, therefore, rising portion 12 and the like can be bent with high accuracy at a prescribed position by a prescribed angle.

Figure 6:
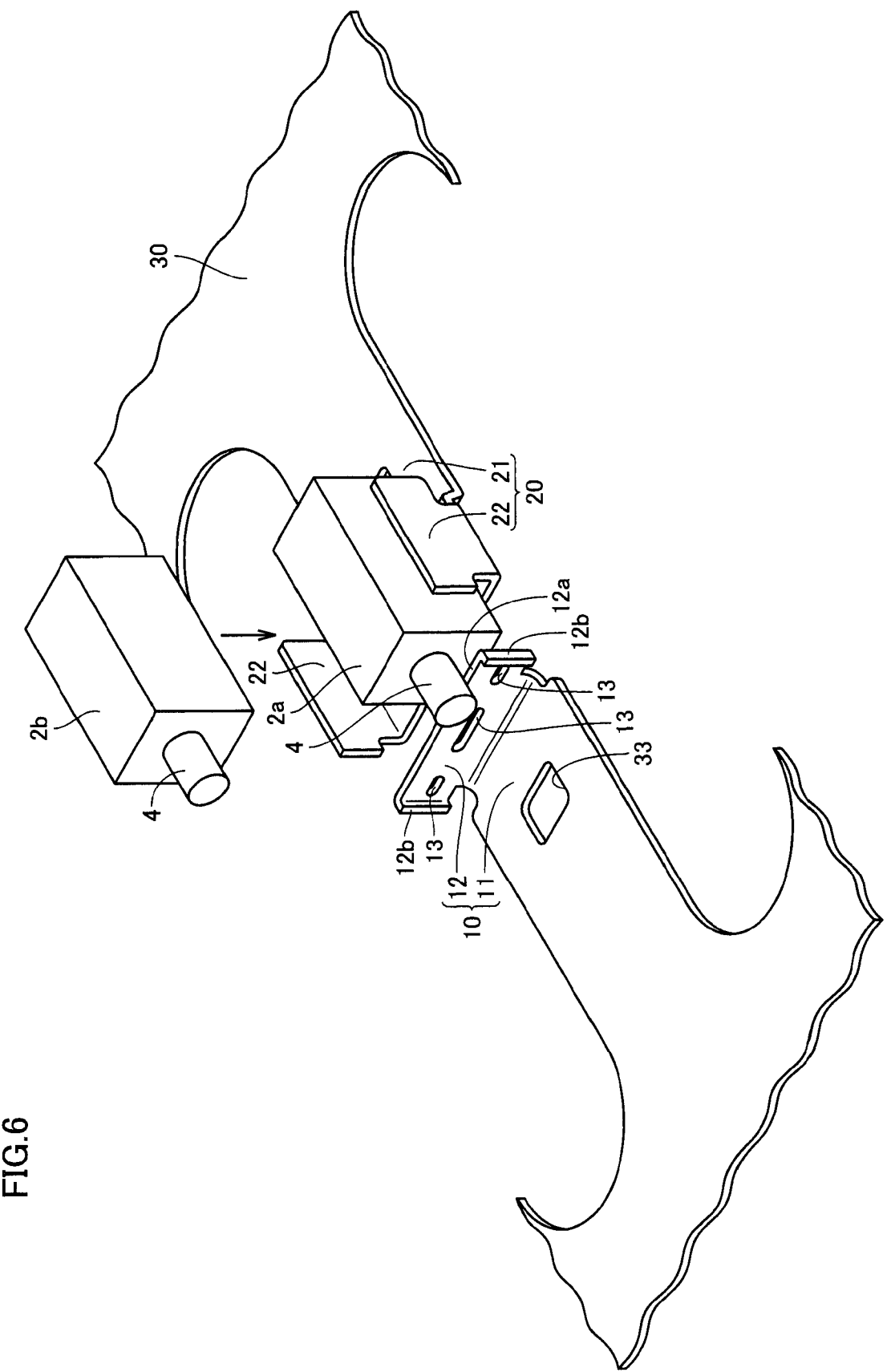
FIG. 6 is a partial perspective view showing a step following the step of FIG. 5, in accordance with the embodiment.

Next, capacitor element 2 is mounted on lead frame 30 (mounting process). As shown in FIG. 6, first, one capacitor element 2a of the two capacitor elements 2 is mounted on lead frame 30 such that its anode portion 4 is in contact with the upper end portion 12a of rising portion 12 and its cathode portion 5 is in contact with one of the pair of side surface portions 22. Next, the other capacitor element 2b is mounted on lead frame 30 such that its anode portion 4 is in contact with the upper end portion 12a of rising portion 12 and its cathode portion 5 is in contact with the other one of the pair of side surface portions 22.

Figure 7:
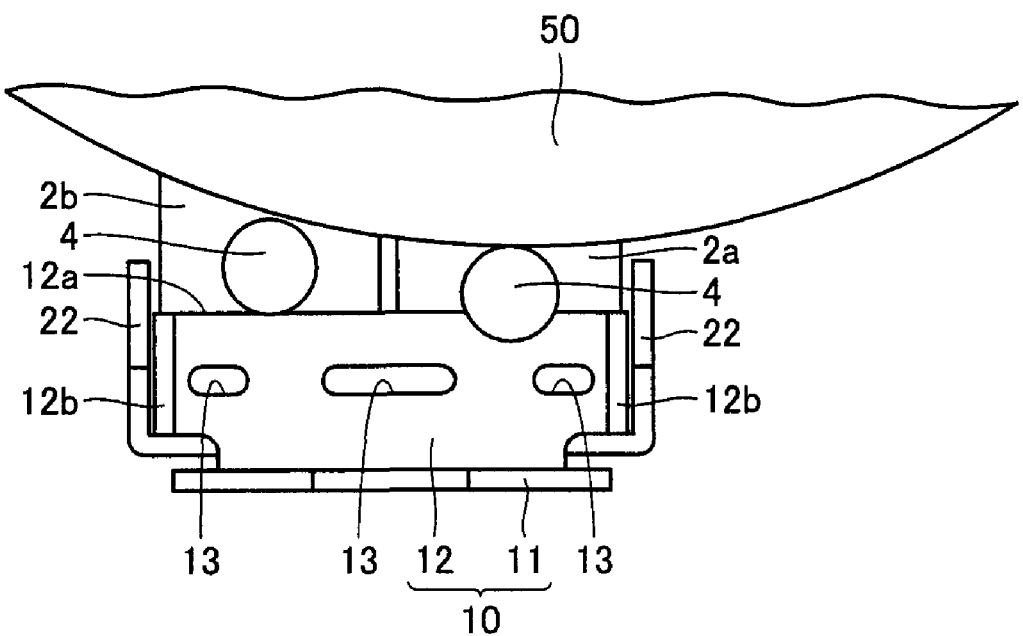
FIG. 7 is a partial front view showing a step following the step of FIG. 6, in accordance with the embodiment.
Figure 8:
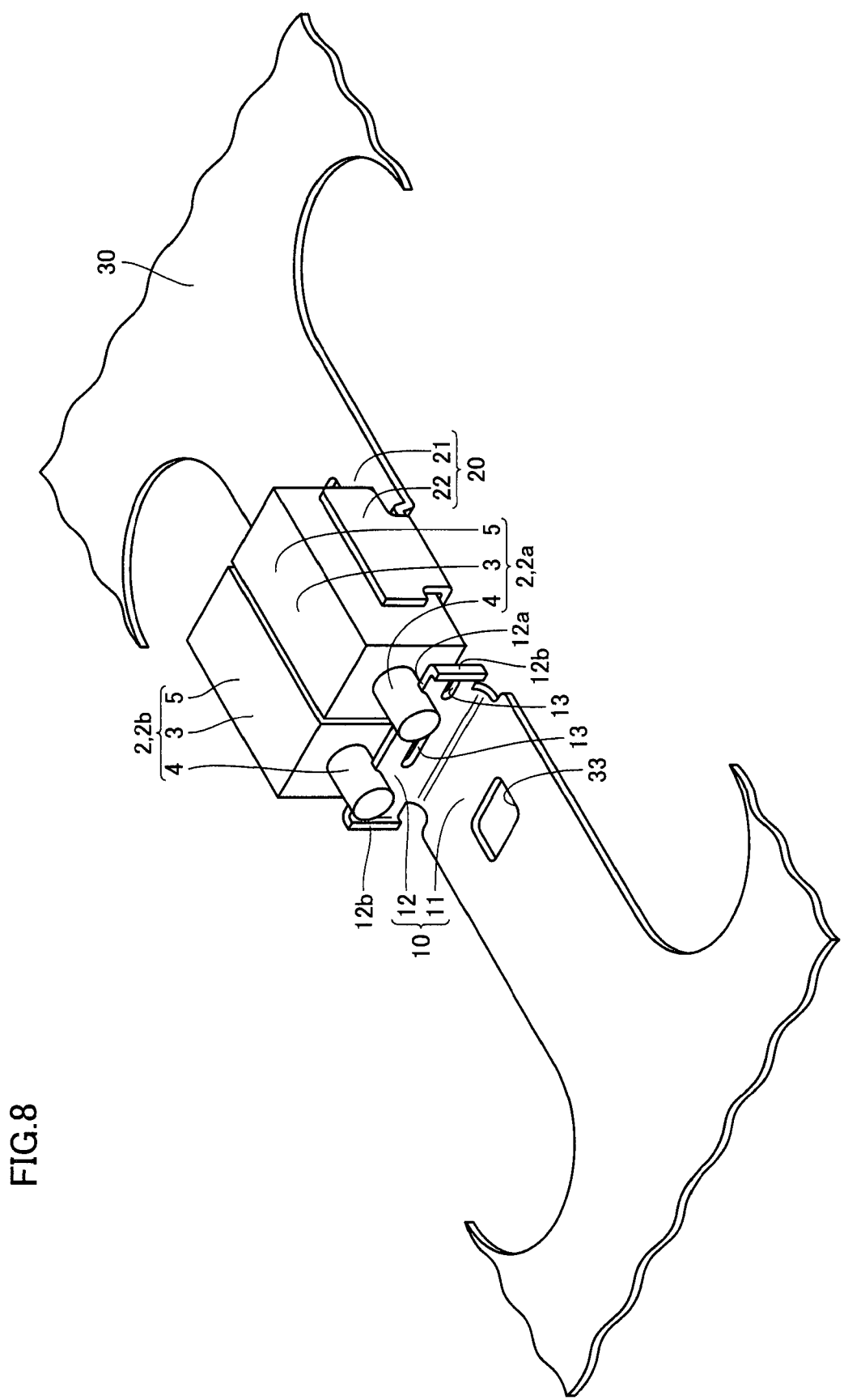
FIG. 8 is a partial perspective view showing a step following the step of FIG. 7, in accordance with the embodiment.

Next, the anode portion is welded to the rising portion (welding process). As shown in FIG. 7, first, a prescribed circular welding electrode 50 is brought into contact with anode portion 4 of one capacitor element 2a, and a prescribed current is caused to flow while a prescribed pressing force is applied from above. By the current flow, heat generates at the portion where anode portion 4 is in contact with upper end portion 12a, so that upper end portion 12a melts and part of anode portion 4 sinks in rising portion 12 and, in this state, anode portion is welded to rising portion 12. Next, welding electrode 50 is moved, and similar process is performed on anode portion 4 of the other capacitor element 2b, whereby anode portion 4 of capacitor element 2b is welded to the rising portion 12. In this manner, two capacitor elements 2a and 2b are welded to lead frame 30, as shown in FIG. 8.

Figure 9:
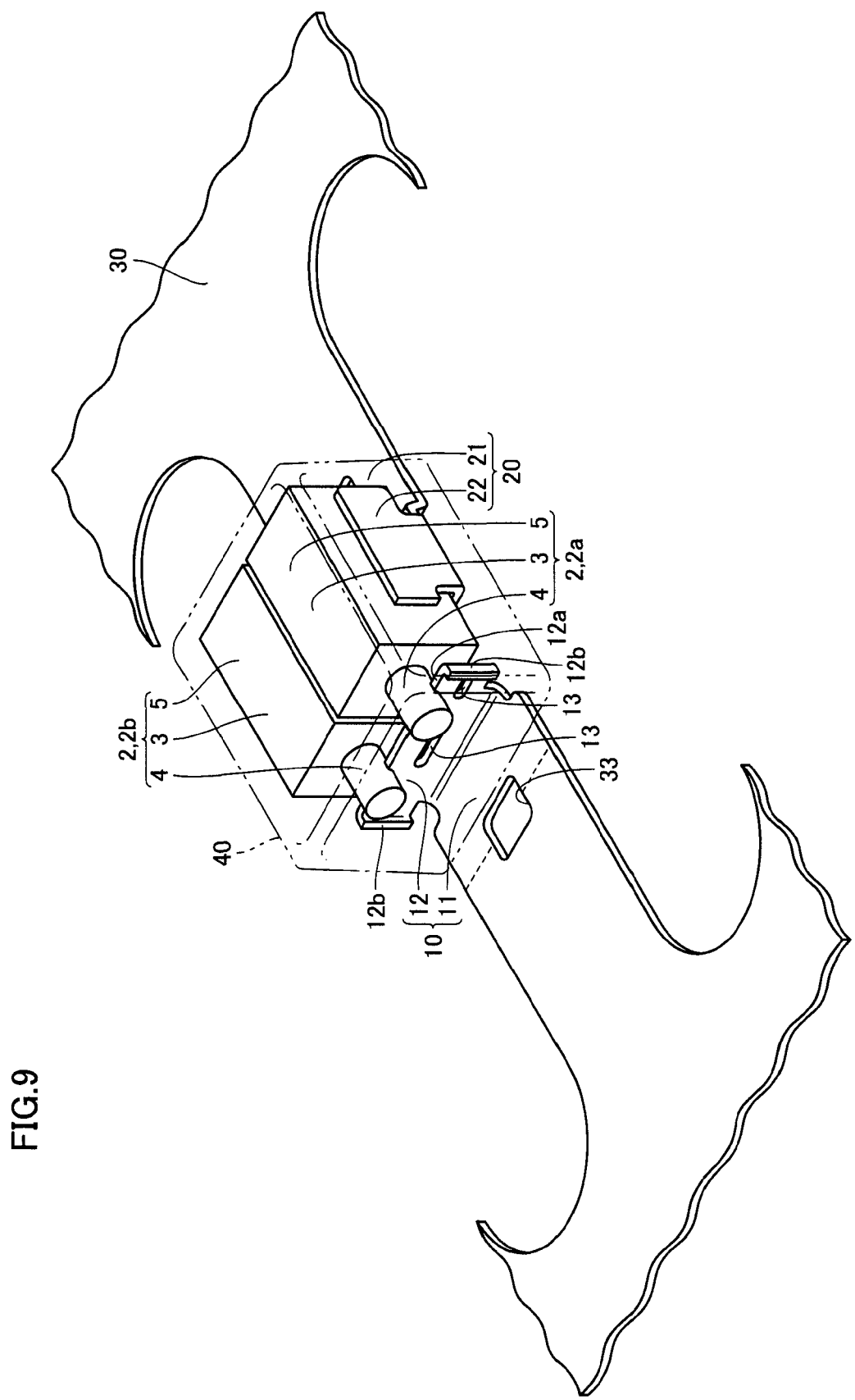
FIG. 9 is a partial perspective view showing a step following the step of FIG. 8, in accordance with the embodiment.

Thereafter, sealing with mold resin takes place (sealing process). Lead frame 30 having capacitor elements 2 welded thereto is placed in a prescribed metal mold. Metal mold consists of an upper mold and a lower mold, and at least one of the upper and lower molds has a cavity to which mold resin is poured in. The cavity is filled with mold resin. Thus, capacitor elements 2 welded to lead frame 30, the portion to be the anode lead frame and the portion to be the cathode lead frame are sealed by mold resin portion 40, as shown in FIG. 9.

Figure 10:
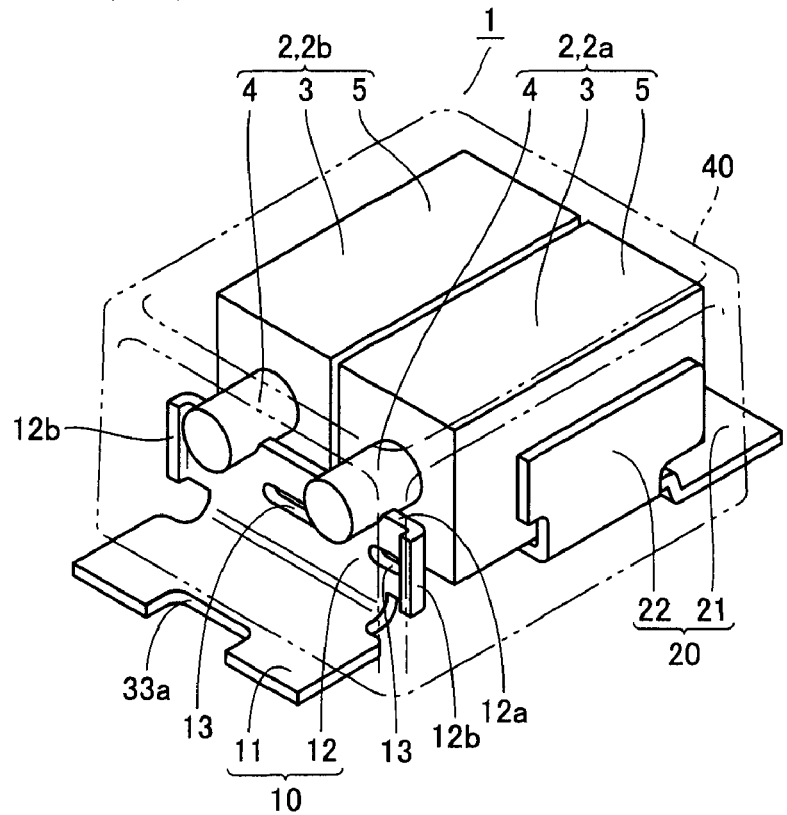
FIG. 10 is a partial perspective view showing a step following the step of FIG. 9, in accordance with the embodiment.

Next, mold resin portion 40 sealing capacitor elements 2 is cut out from lead frame 30. Here, lead frame 30 is cut at a prescribed position (see dotted line), where a part of open side wall surface 33a of fillet hole 33 formed in the portion to be the anode lead frame is left. Similarly, lead frame 30 is cut at a prescribed position (see FIG. 4 etc.), where a part of open side wall surface of fillet hole 34 formed in the portion to be the cathode lead frame is left. The plating on the left portions such as open side wall surface 33a serves to guide solder, when the solid electrolytic capacitor is mounted on a printed circuit board or the like. In this manner, the solid electrolytic capacitor 1 having capacitor elements 2 and the like sealed with mold resin portion 40 is completed as shown in FIG. 10.

In the solid electrolytic capacitor 1 described above, anode portion 4 of capacitor element 2 is welded to rising portion 12 formed integral with anode terminal portion 11, by the bending process of lead frame 30. Therefore, as compared with the conventional solid electrolytic capacitor having a pillow member interposed between the lead frame and the anode portion, such additional pillow member becomes unnecessary, and the process of welding the pillow member to the lead frame becomes unnecessary, so that manufacturing cost can be reduced.

At the rising portion 12, through holes 13 are formed at prescribed positions. Therefore, when welding electrode 50 is bought into contact with anode portion 4 of capacitor element 2 and a prescribed pressing force is applied from above to perform welding, the stress generated at rising portion 12 can be alleviated by the through holes 13. Further, the heat of welding is radiated by the through holes 13, alleviating thermal distortion caused by the heat of welding. As the stress at rising portion 12 is alleviated, deformation of rising portion 12, or deviation of capacitor element 2 from prescribed position of welding, because of the deformation of rising portion 12, can be prevented. As a result, the capacitor element can reliably be welded with high accuracy to the prescribed position of the lead frame.

As to the region where the through hole 13 is to be formed, a region other than immediately below the anode portion 4, of rising portion 12 is desirable. The reason for this is as follows.

That portion of rising portion 12 which is in contact with anode portion 4 melts at the time of welding, and part of the anode portion 4 sinks (see FIG. 7). Therefore, if a through hole is formed immediately below anode portion 4, it is possible that anode portion 4 sinks down to the through hole.

When capacitor element 2 and the like are sealed with mold resin 40, mold resin 40 also flows to through hole 13. This makes easier the escape of gas contained in mold resin 40 to the outside, and therefore, filling property of mold resin 40 can be improved. Further, as the through hole is filled with mold resin 40, through hole 13 comes to serve as an anchor to mold resin portion 40. As a result, closer contact between mold resin portion 40 and rising portion 12 and the like can be attained. Further, by through hole 13, the heat at the time of welding can effectively be radiated.

Further, at rising portion 12, side end portions 12b are bent in a direction away from cathode lead frame 20 (see FIG. 10). Therefore, it becomes possible to reliably prevent deformation or falling of the rising portion 12 because of the pressing force at the time of welding. Further, as the side end portions 12b are bent, closer contact to the mold resin portion 40 can be attained.

Further, as shown, for example, in FIG. 1, cathode lead frame 20 of solid electrolytic capacitor 1 has a pair of side surface portions 22 opposite to each other. Therefore, when capacitor element 2 is mounted on lead frame 30, what is necessary is simply to place capacitor element 2 in an area between one side surface portion 22 and the other side surface portion 22. Thus, positioning of capacitor element 2 with respect to lead frame 30 becomes easier. Further, as the two capacitor elements 2 are positioned between a pair of side surface portions 22, it is possible to prevent positional deviation of capacitor elements 2 before they are welded to rising portion 12.

Further, side surface portion 22 has extended portion 24, so that contact area between the cathode portion 5 of capacitor element 2 and cathode lead frame 20 can be increased. This leads to reduction of equivalent series resistance (ESR) as the resistance component of capacitor element 2.

Figure 11:
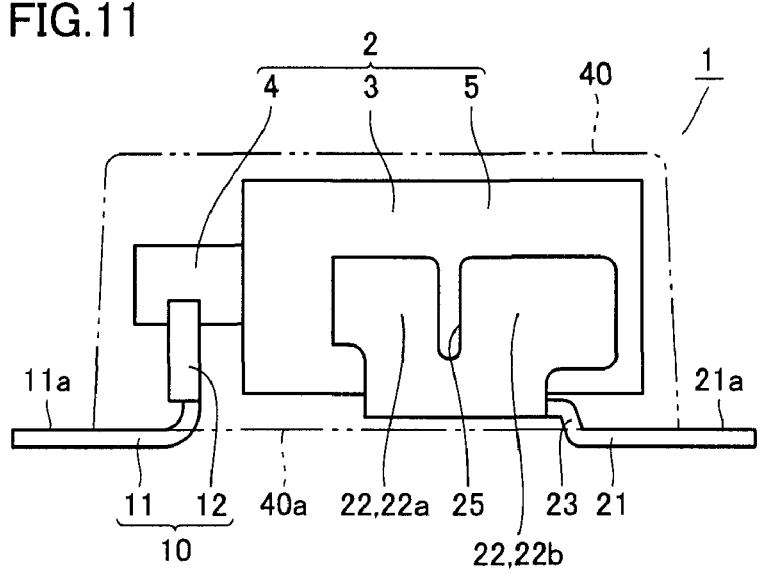
FIG. 11 is a side view showing a modification of a side surface portion of the cathode lead frame in accordance with the embodiment.

Further, as shown in FIG. 11, side surface portion 22 may be divided into side surface portions 22a and 22b by forming a slit 25. This ensures contact of side surface portion 22 to cathode portion 5. Cathode portion 5 is dipped in silver paste and lifted and, therefore it is coated with silver paste. As a result, sometimes a pool of silver paste forms on cathode portion 5. At this time, when side surface portion 22 is divided into side surface portions 22a and 22b, it becomes possible to bring side surface portion 22b into contact with a portion with silver paste pool and to bring side surface portion 22a into contact with a portion without silver paste pool. Therefore, as compared with the side surface portion without any slit, contact area is ensured between side surface portion 22 and cathode portion 5.

Further, in solid electrolytic capacitor 1 described above, bottom surface 40a of mold resin portion 40 is in direct contact with upper surface 11a of anode terminal portion 11 and upper surface 21a of cathode terminal portion 21. Specifically, bottom surface 40a and upper surfaces 11a and 21a are positioned substantially on the same plane. Therefore, it becomes possible to ensure larger capacity of the cavity, by placing an end portion of metal mold cavity closer to the fillet hole. This will be described with respect to a solid electrolytic capacitor of a comparative example.

Figure 12:
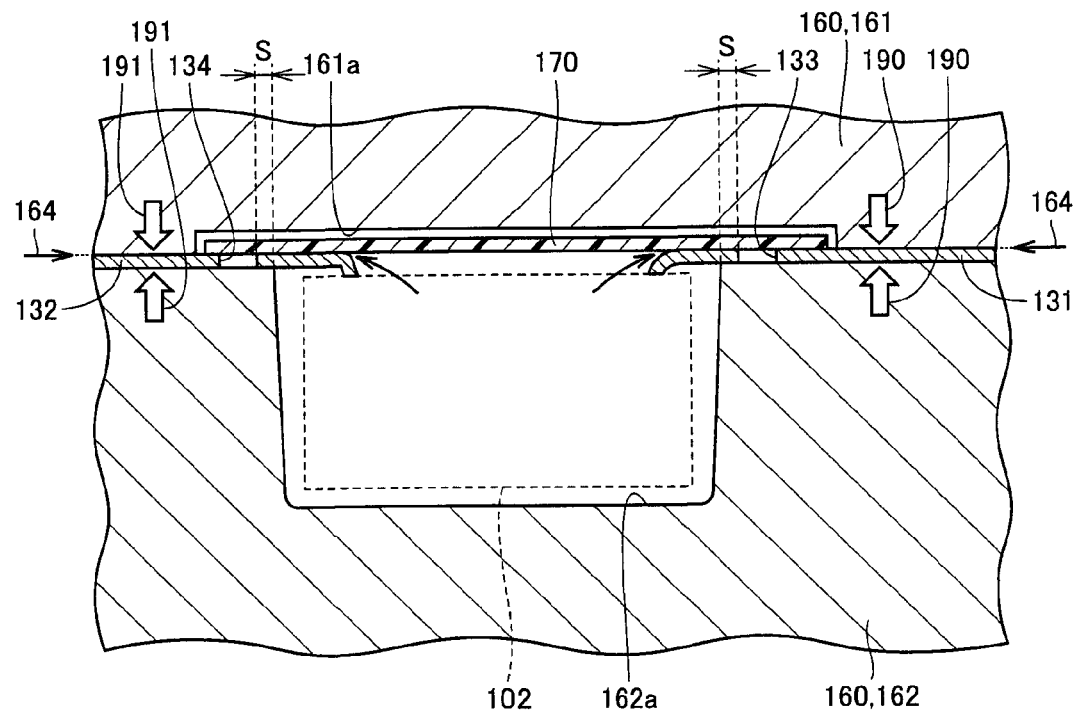
FIG. 12 is a partial sectional view showing the step of sealing the solid electrolytic capacitor with mold resin, in accordance with a comparative example.

First, in the solid electrolytic capacitor in accordance with the comparative example, the bottom surface of mold resin portion is formed to be at an approximately the same position as the lower surface of anode terminal portion and the lower surface of cathode terminal portion. As shown in FIG. 12, at the step of filling mold resin, in order to prevent mold resin from leaking to the surfaces of the portion 131 to be the anode lead frame and the portion 132 to be the cathode lead frame, an insulating tape 170 formed, for example, of polyimide is adhered to the surface of the lead frame. Further, the insulating film is adhered to close fillet holes 133 and 134 formed in lead frame 130. To prevent mold resin from flowing between insulating tape 170 and lead frame 130 and further leaking to fillet holes 133 and 134 because of mold resin introducing pressure, an end portion of a cavity 162a is separated by a prescribed distance S from fillet holes 133 and 134.

An upper metal mold 161 has a recess 161a formed in consideration of the thickness of insulating tape 170. Fastening forces (arrows 190, 191) are applied to the upper and lower metal molds 161 and 162 at portions other than where the insulating tape 170 is adhered, and mold resin is poured into cavity 162a formed in lower metal mold 162, so that capacitor element and the like are sealed. It is noted that an arrow 164 indicates a position of splitting surface (joint surface) of upper and lower metal molds 161 and 162.

Figure 13:
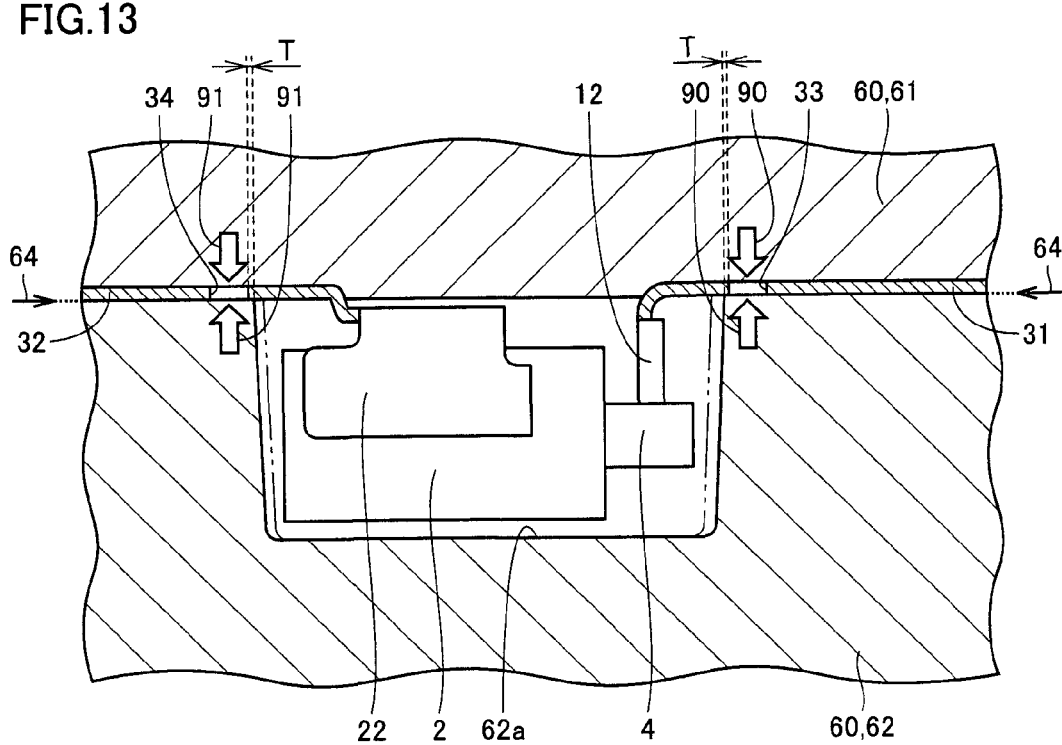
FIG. 13 is a partial sectional view showing the step of sealing the solid electrolytic capacitor with mold resin, in accordance with the embodiment.

In contrast, in solid electrolytic capacitor described above, the bottom surface of mold resin portion is formed to be substantially at the same position as the upper surface of anode terminal portion and the upper surface of cathode terminal portion. As shown in FIG. 13, at the step of filling mold resin, it is unnecessary to adhere an insulating tape to the lead frame. Therefore, it is possible to apply the fastening forces (arrows 90, 91) to upper metal mold 61 and lower metal mold 62 at positions very close to cavity 62a. Specifically, the distance between the end portion of cavity 62a and fillet holes 33, 34 can be made shorter from S to T. Further, the distance of protrusion of lead frame (anode terminal portion 11, cathode terminal portion 12) from mold resin portion 40 becomes shorter and, therefore, possible defects caused by being caught, for example, during packing or shipment can be reduced. It is noted that an arrow 64 indicates a position of splitting surface (joint surface) of upper and lower metal molds 61 and 62.

In this manner, in the solid electrolytic capacitor described above, upper metal mold 61 and lower metal mold 62 can be fastened at close vicinity of cavity 62a and, therefore, cavity 62a can be placed very close to fillet holes 33 and 34. Therefore, with fillet holes 33 and 34 being at the same position, larger capacity of the cavity can be ensured and, therefore, a larger capacitor element can be mounted as the capacitor element to be sealed in mold resin portion 40. Further, the distance of protrusion of anode terminal portion 11 and cathode terminal portion 12 from mold resin portion 40 becomes shorter and, therefore, possible defects caused by being caught, for example, during packing or shipment can be reduced. It is noted that two-dotted lines represent the ends of lower mold cavity of the comparative example.

Further, the lead frame is pinched between the upper and lower metal molds 61 and 62 with the upper metal mold being in direct contact with the (rear surface of) lead frame and, therefore, flowing of mold resin to the rear surfaces of anode terminal portion 11 and cathode terminal portion 12 can reliably be prevented.

Modification of through Holes

Figure 14:
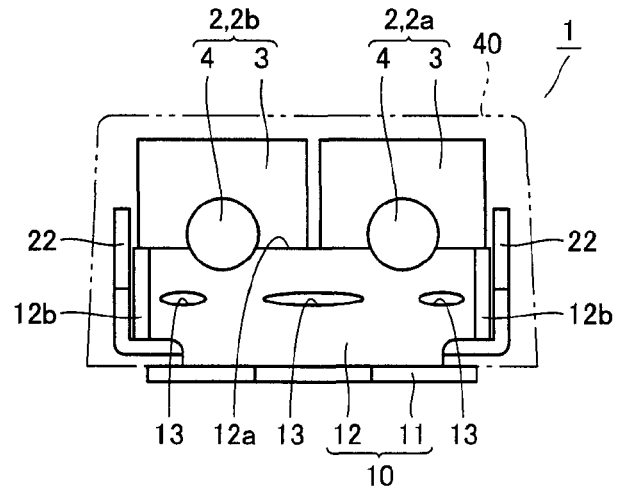
FIG. 14 is a front view showing a first modification of the through hole formed at the rising portion, in accordance with the embodiment.
Figure 15:
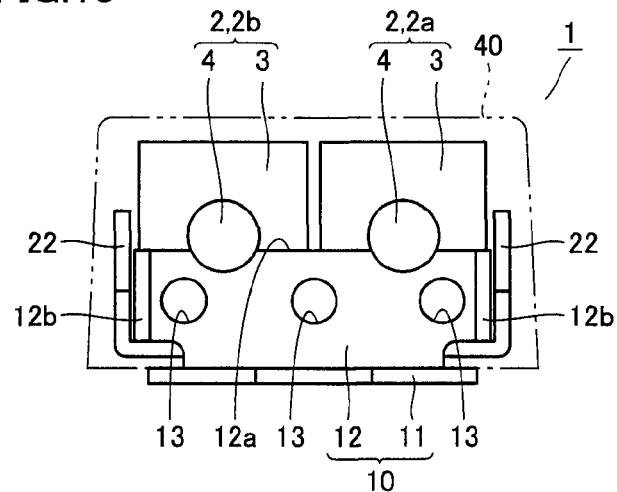
FIG. 15 is a front view showing a second modification of the through hole formed at the rising portion, in accordance with the embodiment.
Figure 16:
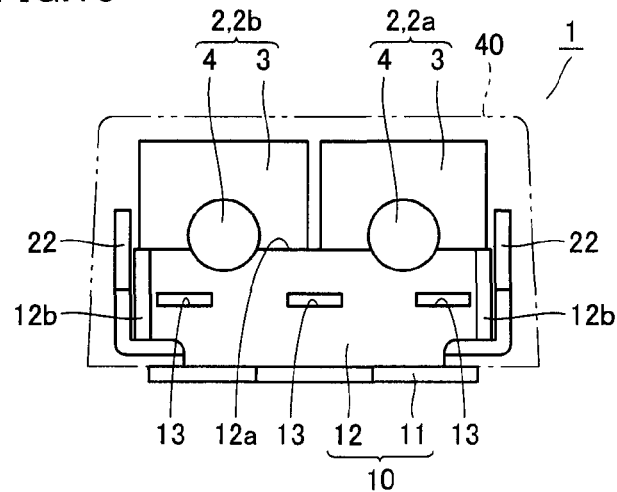
FIG. 16 is a front view showing a third modification of the through hole formed at the rising portion, in accordance with the embodiment.

As the through hole 13 formed at rising portion 12 of solid electrolytic capacitor 1, other than the shape of through hole 13 shown in FIG. 2 and the like, through hole 13 may have, for example, an oval shape as shown FIG. 14. Alternatively, through hole 13 may have a circular shape as shown in FIG. 15. Further, through hole 13 may have a rectangular shape as shown in FIG. 16, and the shape is not limited to the above as long as the stress at rising portion 12 can be alleviated. In FIGS. 14 to 16, the same members as those of solid electrolytic capacitor 1 shown in FIG. 3 are denoted by the same reference characters.

Further, in solid electrolytic capacitor 1 above, it has been described that through hole 13 should preferably be formed at a region other than immediately below the anode portion 4 of rising portion 12. The position of through hole is not limited to such a region. If the shape is longitudinal and there is no possibility of the anode portion sinking down to the through hole at the time of welding, the through hole may be formed immediately below the anode portion. The through hole is made longitudinal to prevent the current flowing from the anode portion to the rising portion from taking a long detour.

Variation of Number of Capacitor Elements

Figure 17:
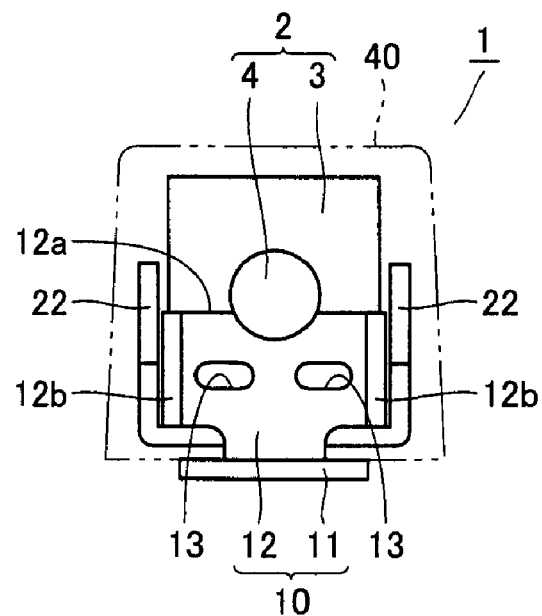
FIG. 17 is a front view showing the solid electrolytic capacitor when one capacitor element is mounted.
Figure 18:
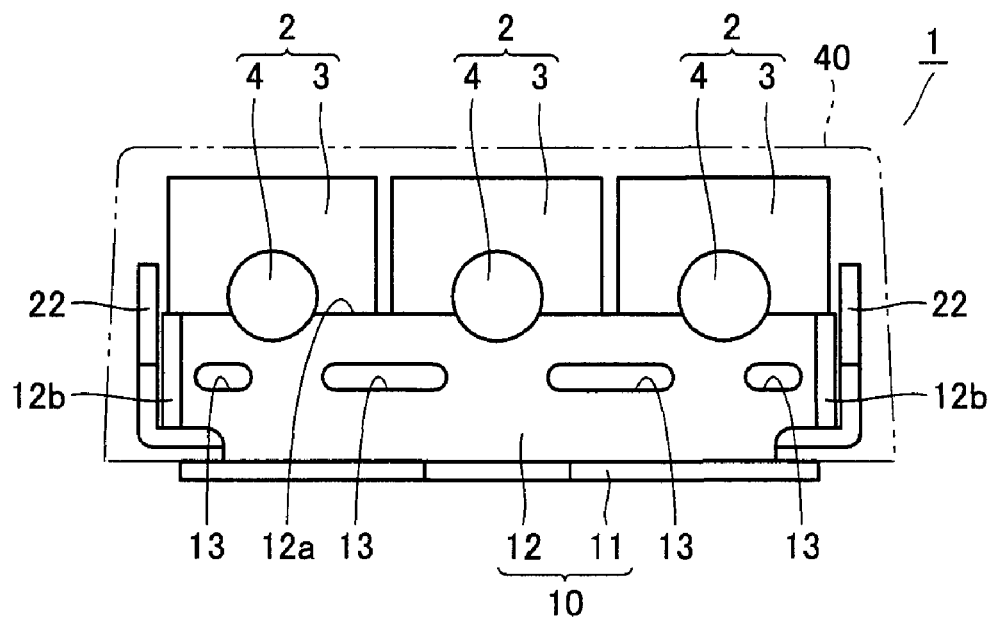
FIG. 18 is a front view showing the solid electrolytic capacitor when three capacitor elements are mounted.
Figure 19:
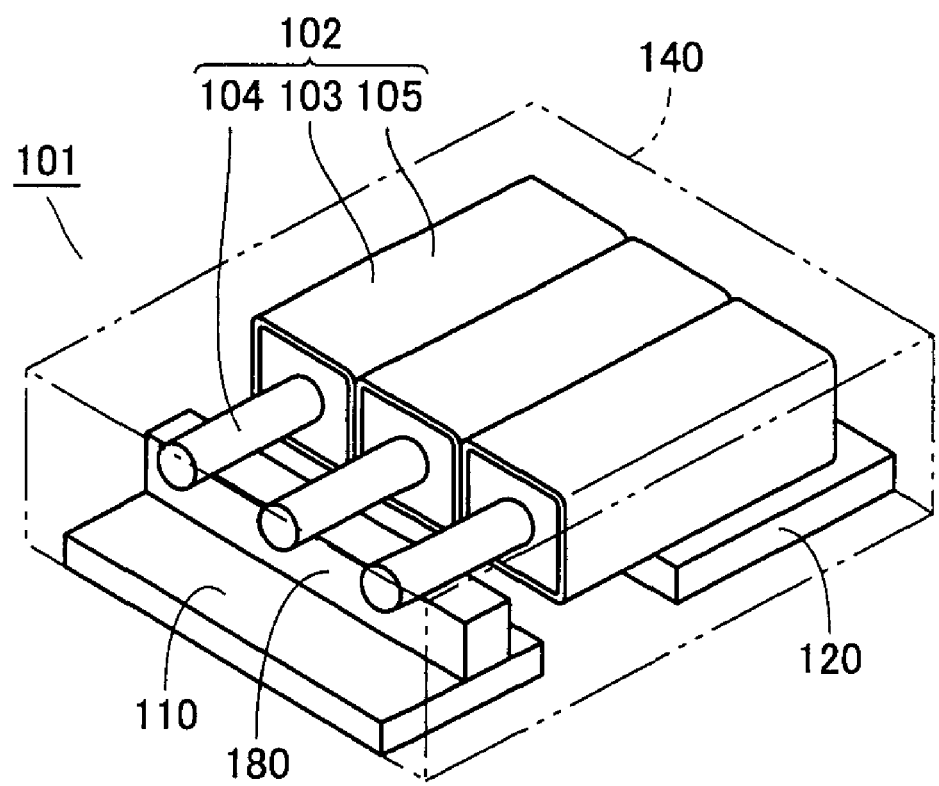
FIG. 19 is a perspective view showing a conventional solid electrolytic capacitor.

In the foregoing, solid electrolytic capacitor 1 having two capacitor elements 2 has been described as an example of solid electrolytic capacitor 1 (see FIG. 1 etc.). The number of capacitor elements 2 is not limited to two, and solid electrolytic capacitor 1 may have one capacitor element 2 mounted thereon as shown in FIG. 17. Further, solid electrolytic capacitor 1 may have three capacitor elements 2 mounted thereon, as shown in FIG. 18. Further, the solid electrolytic capacitor may have four or more capacitor elements mounted thereon (not shown). In FIGS. 17 and 18, the same components as those of solid electrolytic capacitor 1 shown in FIG. 3 are denoted by the same reference characters. In each of the solid electrolytic capacitors mentioned above, the number of through holes 13 formed at rising portion 12 is larger than the number of mounted capacitor elements 2.

In a solid electrolytic capacitor capable of mounting two or more capacitors, the number of mounted capacitor elements may be smaller than the maximum mountable number. In that case, the capacitor elements may be arranged at arbitrary positions in the region between the pair of opposing side surface portions of the cathode lead frame. Then, through holes may be formed at prescribed regions of the rising portion corresponding to the positions of capacitor elements. The position of forming the through hole can easily be changed simply by changing the punching block of a punching metal mold, and it is unnecessary to prepare a new metal mold.

In the method of manufacturing the solid electrolytic capacitor, by way of example, the anode portion of capacitor element is connected to the rising portion by welding (resistance welding) using a welding electrode. Other than this method, the anode portion may be connected to the rising portion by laser welding. Further, the anode portion may be connected to the rising portion using a conductive paste. Further, by combining these methods, wielding by welding electrode may be performed first, and a gap between the anode portion and the rising portion, for example, may be filled with conductive paste. This approach attains firmer connection between the anode portion and the rising portion, and increases contact area between the anode portion and the rising portion. Thus, ESR can be reduced.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising:
   a capacitor element having an anode portion and a cathode portion;
   a mold resin portion sealing said capacitor element;
   an anode lead frame connected to said anode portion; and
   a cathode lead frame connected to said cathode portion;
   said anode lead frame including
   an anode terminal portion exposed along a bottom surface of said mold resin portion, and
   a rising portion rising from said anode terminal portion toward said cathode portion of said capacitor element, and having a through hole formed therein,
   said through hole being filled with said mold resin portion.

2. The solid electrolytic capacitor according to claim 1, wherein
   said through hole is formed at a region other than a region immediately below said anode portion, of said rising portion.

3. The solid electrolytic capacitor according to claim 1, wherein
   said rising portion rises from an end of said anode terminal portion closer to said cathode portion of said capacitor element.

4. The solid electrolytic capacitor according to claim 3, wherein said rising portion includes
   an upper end portion in contact with said anode portion, and
   side end portions at one and the other positions in a direction of extension of said upper end portion; and
   each of said side end portions is bent in a direction away from said cathode portion of said capacitor element.

5. The solid electrolytic capacitor according to claim 1, comprising:
   a plurality of said capacitor elements; wherein
   said anode portion of each of said plurality of capacitor elements is arranged in the same direction and connected to said anode lead frame.

6. The solid electrolytic capacitor according to claim 5, wherein
   said through hole is formed at a region immediately below a portion between one and the other capacitor elements adjacent to each other, among said plurality of capacitor elements.

7. The solid electrolytic capacitor according to claim 1, wherein
   said through hole is formed to be larger in number than said capacitor elements.

8. The solid electrolytic capacitor according to claim 1, wherein
   said rising portion and said anode terminal portion are formed of the same member.

9. The solid electrolytic capacitor according to claim 1, wherein
   said rising portion includes an upper end portion in contact with said anode portion, and
   said through hole is formed between said upper end portion and said anode terminal portion.

* * * * *